(12) United States Patent
Kaneichi

(10) Patent No.: US 11,354,687 B2
(45) Date of Patent: Jun. 7, 2022

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventor: Daiki Kaneichi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/074,386

(22) Filed: Oct. 19, 2020

(65) Prior Publication Data

US 2021/0117997 A1    Apr. 22, 2021

(51) Int. Cl.
*G06Q 30/02* (2012.01)
*H04W 4/02* (2018.01)
*G06Q 10/06* (2012.01)
*G01C 21/36* (2006.01)
*G06Q 50/30* (2012.01)

(52) U.S. Cl.
CPC ..... *G06Q 30/0205* (2013.01); *G01C 21/3697* (2013.01); *G06Q 10/06315* (2013.01); *G06Q 30/0215* (2013.01); *G06Q 30/0219* (2013.01); *G06Q 50/30* (2013.01); *H04W 4/023* (2013.01)

(58) Field of Classification Search
CPC ..................................................... G06Q 30/02
See application file for complete search history.

(56) References Cited

U.S. PATENT DOCUMENTS

| 2011/0184596 A1* | 7/2011 | Andreasson ............. G08G 1/22 701/19 |
| 2012/0084225 A1* | 4/2012 | Soldatenkov .......... G06Q 10/06 705/345 |
| 2018/0136667 A1* | 5/2018 | Jimenez Hernandez .................... G05D 1/0287 |

FOREIGN PATENT DOCUMENTS

| CN | 110766492 A | * | 2/2020 | ............. G06Q 30/06 |
| JP | 2014-029580 A | | 2/2014 | |

OTHER PUBLICATIONS

Automatically dispatching taxies to client location and optimizing taxi distribution (English) (United States)), The IP.com Prior Art Database, Jul. 29, 2011 (Year: 2011).*

* cited by examiner

*Primary Examiner* — Marilyn G Macasiano
(74) *Attorney, Agent, or Firm* — Oliff PLC

(57) ABSTRACT

An information processing apparatus disclosed includes a control unit configured to execute the processing of acquiring location information indicating the present locations of empty taxis, detecting an overpopulated region in which there are taxis larger in number than a predetermined upper limit based on the location information, and sending to a taxi located in the overpopulated region a removal request containing information requesting its removal to a specific region other than the overpopulated region and information about an incentive that will be given if the taxi removes to the specific region.

20 Claims, 8 Drawing Sheets

[Fig. 1]
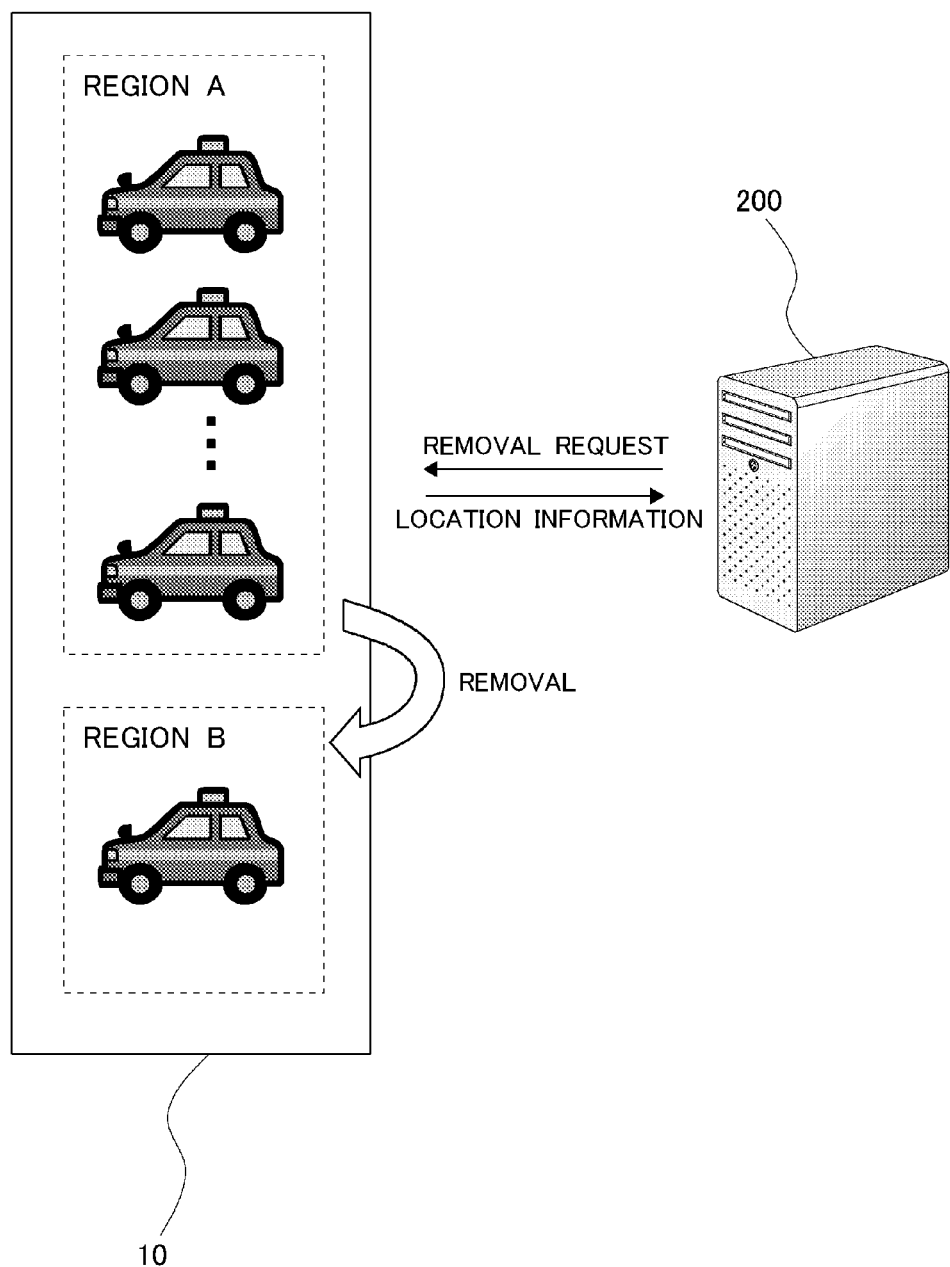

[Fig. 2]
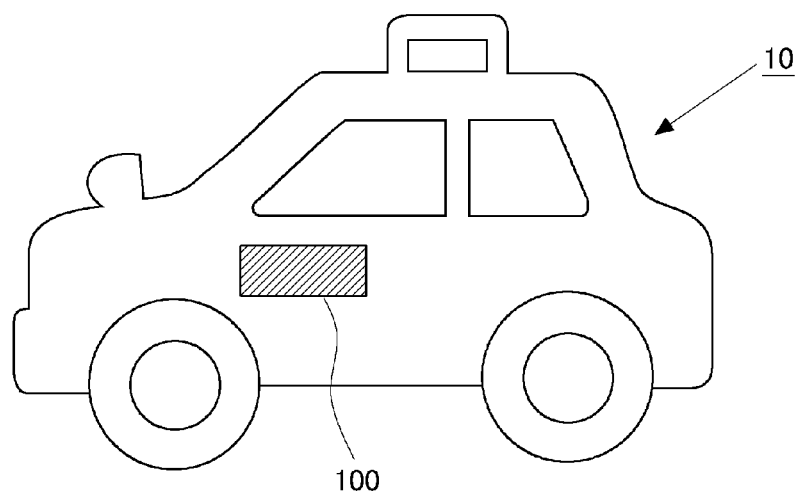

[Fig. 3]
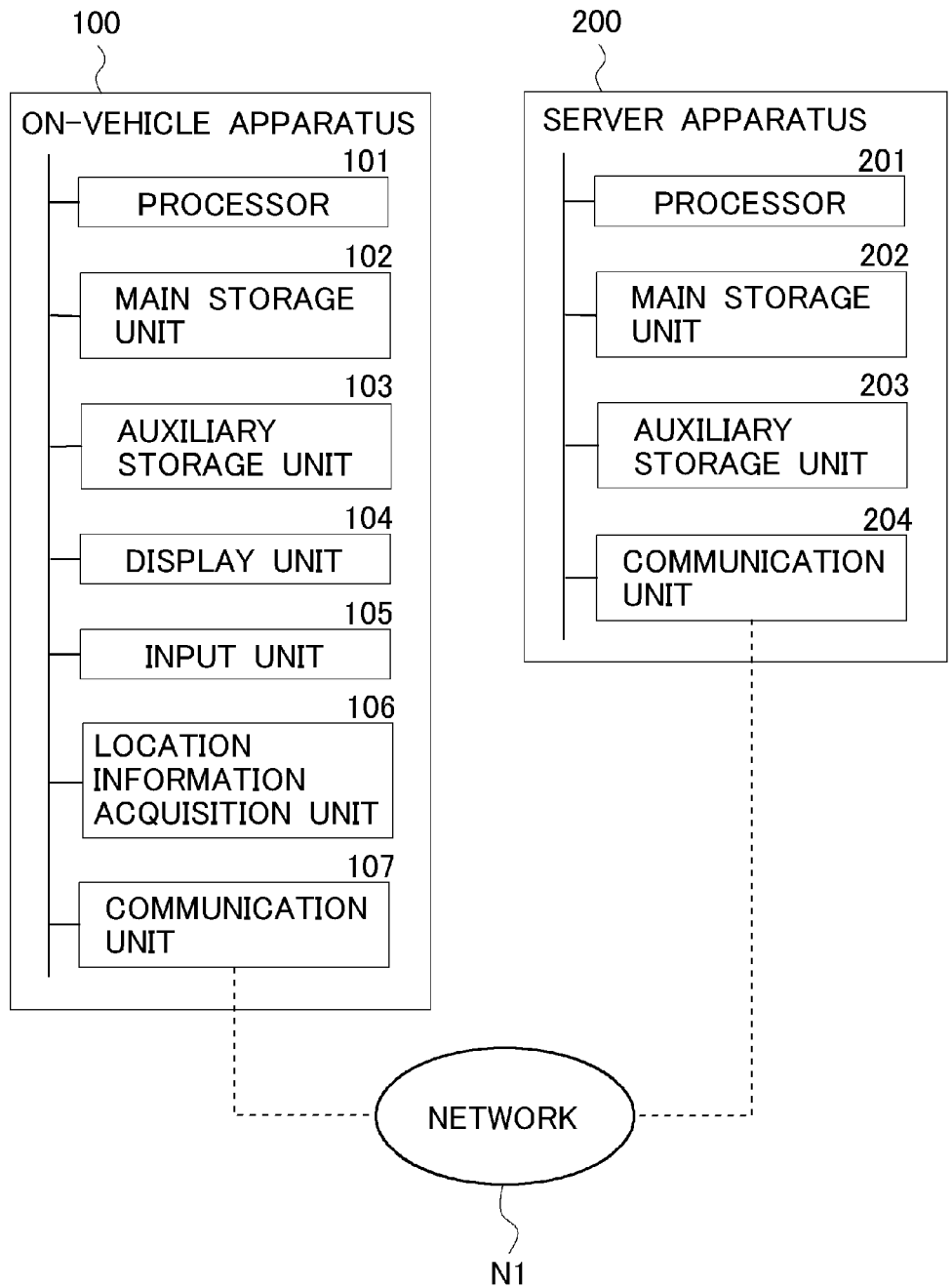

[Fig. 4]
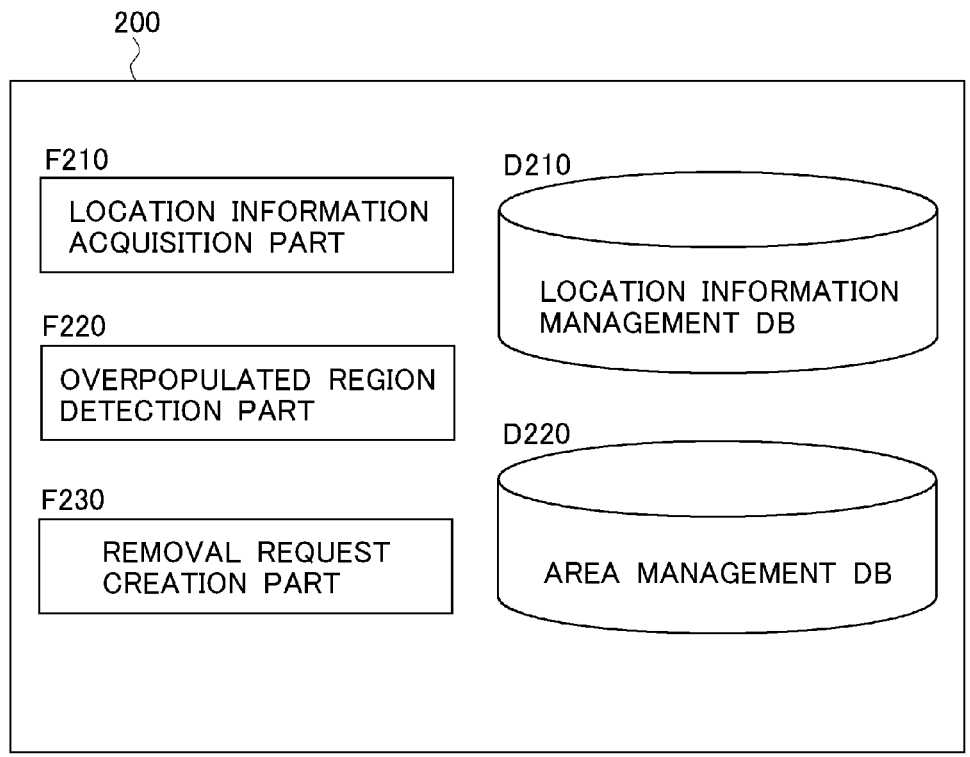
[Fig. 5]
| VEHICLE ID | PRESENT LOCATION | REGION ID |
|---|---|---|
| S001 | ---- | A |
| S002 | ---- | A |
| S003 | ---- | B |
| ⋮ | | |

[Fig. 6]

| REGION ID | DEMANDED NUMBER |
|---|---|
| A | 10 |
| B | 2 |
| ⋮ | ⋮ |

[Fig. 7]
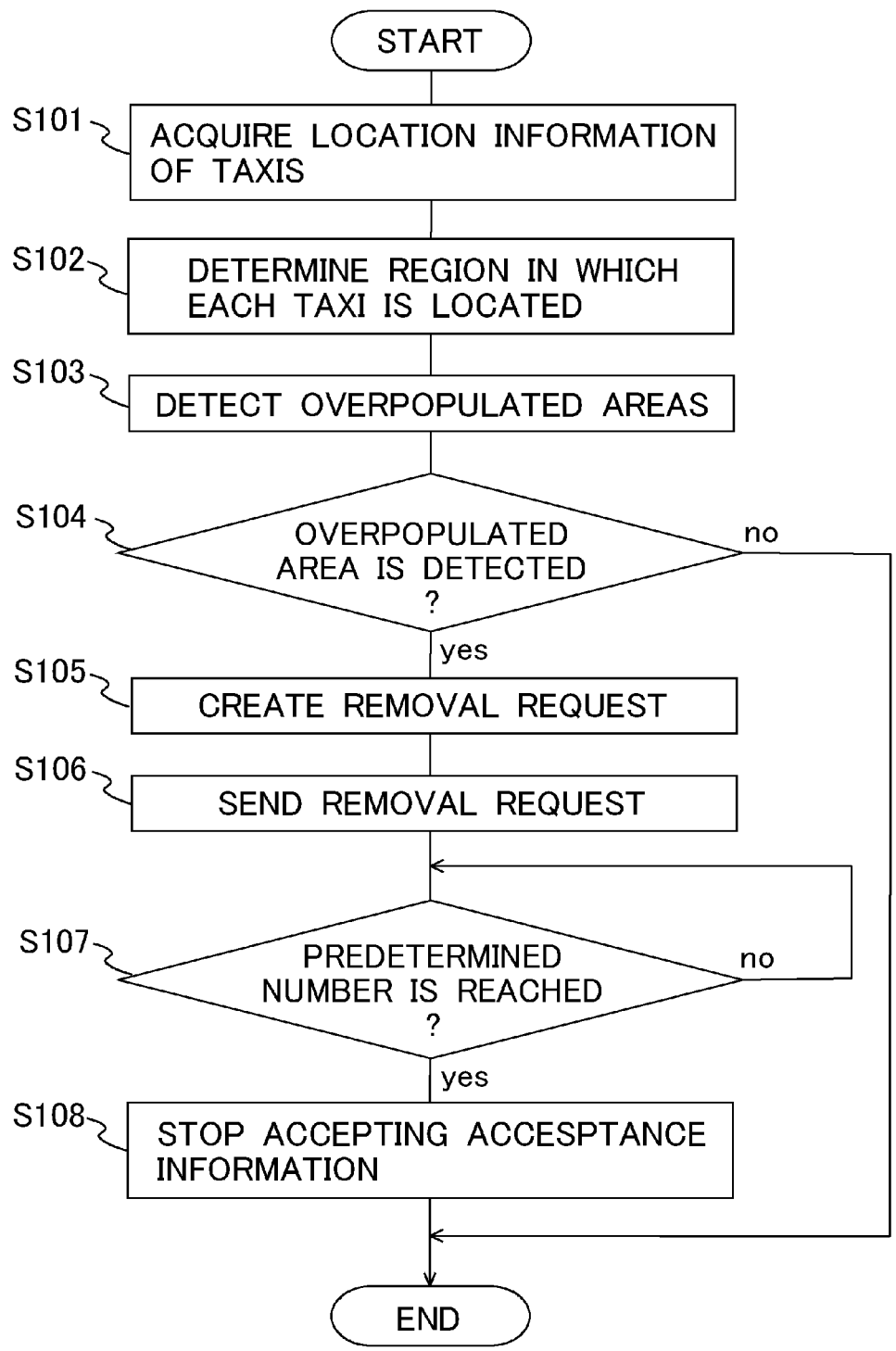

[Fig. 8]
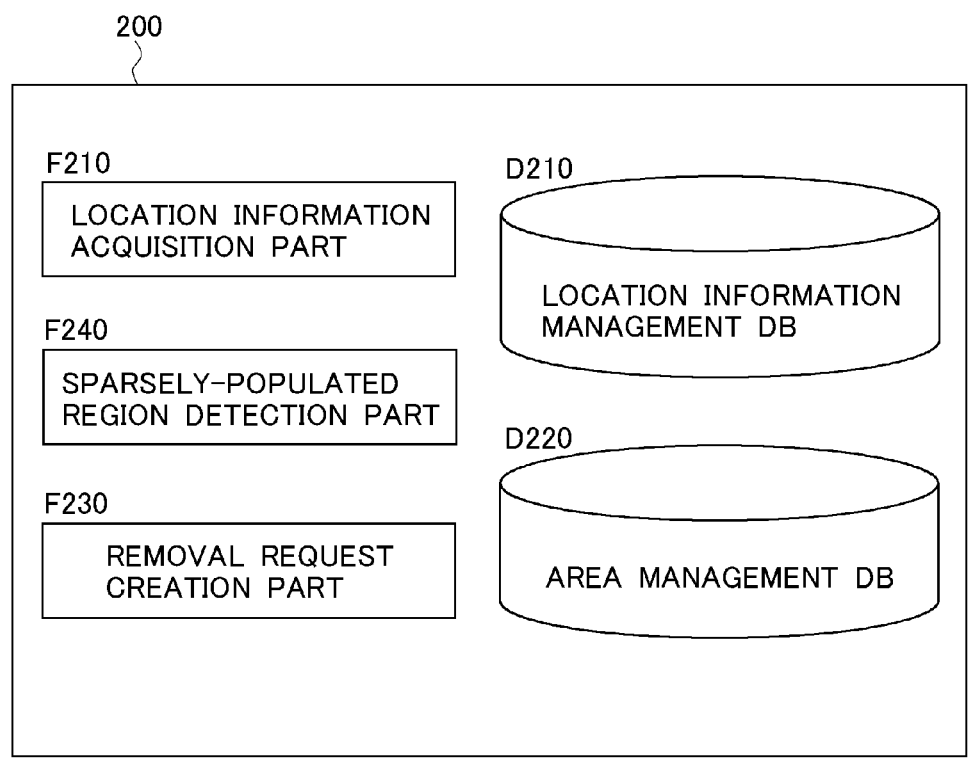

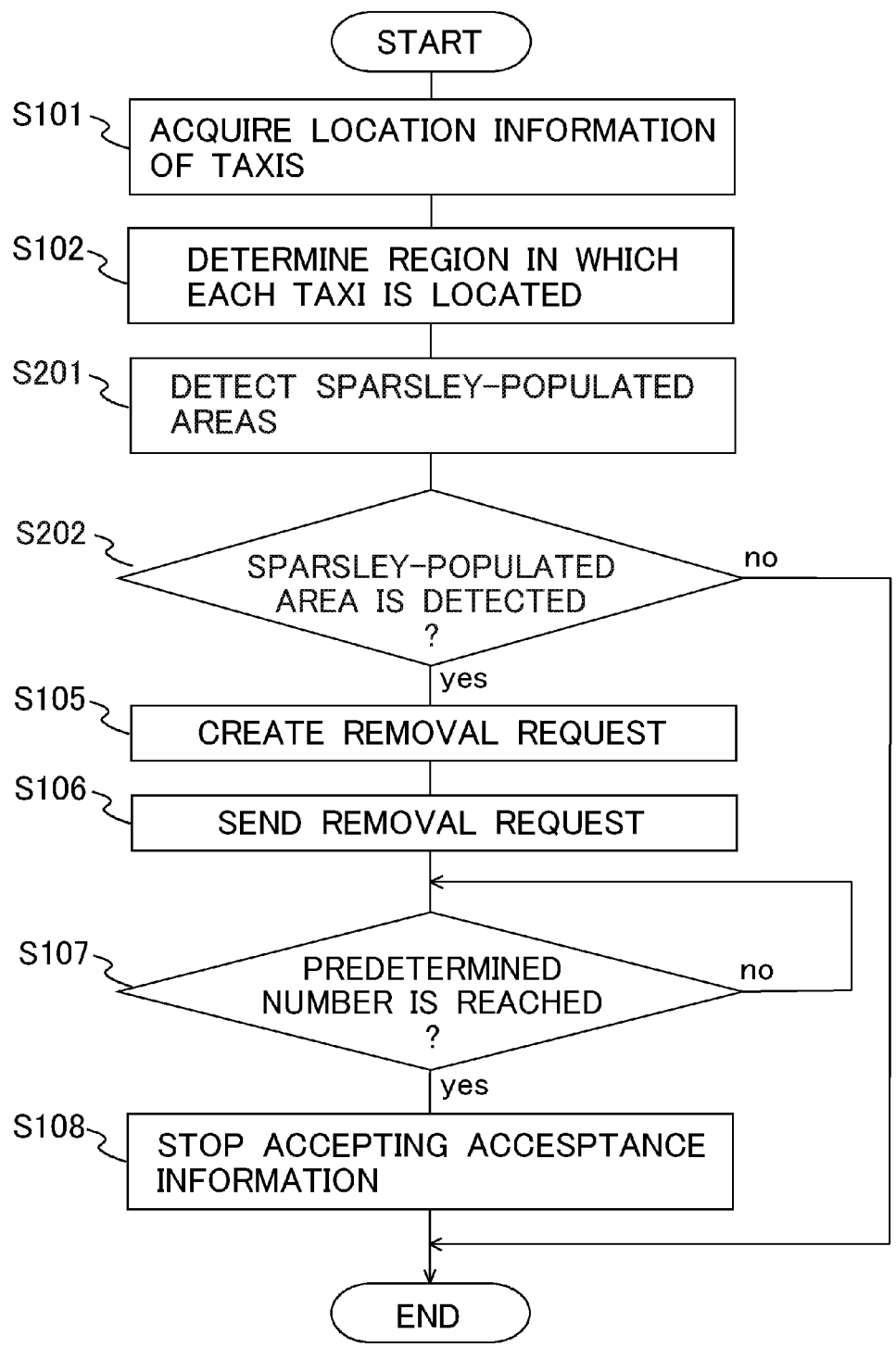
[Fig. 9]

INFORMATION PROCESSING APPARATUS AND INFORMATION PROCESSING METHOD

CROSS REFERENCE TO RELATED APPLICATION

This application claims the benefit of Japanese Patent Application No. 2019-190361, filed on Oct. 17, 2019, which is hereby incorporated by reference herein in its entirety.

BACKGROUND

Technical Field

The present disclosure relates to an information processing apparatus and an information processing method.

Description of the Related Art

There are prevailing taxi dispatch application programs (or applications) that can run on portable terminals such as smartphones. Users can use such applications to request dispatch of a taxi to a desired place of ride (see, for example, Patent Literature 1 in the citation list below).

CITATION LIST

Patent Literature

Patent Literature 1: Japanese Patent Application Laid-Open No. 2014-029580

SUMMARY

Empty taxis (or taxis without passengers) tend to concentrate in areas where the demand for taxis is high, examples of which include busy streets and areas near train stations. Hence, requests for dispatch of a taxi made by users in areas where the demand for taxis is low (such as suburban areas or residential areas) may not be fulfilled quickly.

The present disclosure has been made in the above circumstances, and an object of the present disclosure is to provide a technology that enables quick fulfillment of requests for dispatch of taxis made by users in a larger area.

According to an aspect of the present disclosure, there is provided an information processing apparatus.

An information processing apparatus according to a first mode may comprise a control unit configured to execute the processing of;

acquiring location information indicating the present locations of empty taxis;

detecting an overpopulated region in which there are taxis larger in number than a predetermined upper limit based on the location information; and sending to a taxi located in the overpopulated region a removal request containing information requesting its removal to a specific region other than the overpopulated region and information about an incentive that will be given if the taxi removes to the specific region.

An information processing apparatus according to a second mode may comprise a control unit configured to execute the processing of:

acquiring location information indicating the present locations of empty taxis;

detecting a sparsely-populated region in which there are taxis smaller in number than a predetermined lower limit based on the location information; and sending to a taxi located in a region other than the sparsely-populated region a removal request containing information requesting its removal to the sparsely-populated region and information about an incentive that will be given if the taxi removes to the sparsely-populated region.

According to a second aspect of the present disclosure, there is provided an information processing method.

An information processing method according to a first mode of the second aspect of the present disclosure may comprise the following steps of processing executed by a computer:

acquiring location information indicating the present locations of empty taxis;

detecting an overpopulated region in which there are taxis larger in number than a predetermined upper limit based on the location information; and sending to a taxi located in the overpopulated region a removal request containing information requesting its removal to a specific region other than the overpopulated region and information about an incentive that will be given if the taxi removes to the specific region.

An information processing method according to a second mode of the second aspect of the present disclosure may comprise the following steps of processing executed by a computer:

acquiring location information indicating the present locations of empty taxis;

detecting a sparsely-populated region in which there are taxis smaller in number than a predetermined lower limit based on the location information; and sending to a taxi located in a region other than the sparsely-populated region a removal request containing information requesting its removal to the sparsely-populated region and information about an incentive that will be given if the taxi removes to the sparsely-populated region.

According to a third aspect of the present disclosure, there are provided an information processing program or a non-transitory storage medium in which an information processing program is stored.

An information processing program according to a first mode of the third aspect of the present disclosure may be configured to cause a computer to execute the processing of:

acquiring location information indicating the present locations of empty taxis;

detecting an overpopulated region in which there are taxis larger in number than a predetermined upper limit based on the location information; and sending to a taxi located in the overpopulated region a removal request containing information requesting its removal to a specific region other than the overpopulated region and information about an incentive that will be given if the taxi removes to the specific region.

An information processing program according to a second mode of the third aspect of the present disclosure may be configured to cause a computer to execute the processing of;

acquiring location information indicating the present locations of empty taxis;

detecting a sparsely-populated region in which there are taxis smaller in number than a predetermined lower limit based on the location information; and sending to a taxi located in a region other than the sparsely-populated region a removal request containing information requesting its removal to the sparsely-populated region and information about an incentive that will be given if the taxi removes to the sparsely-populated region.

The present disclosure can provide a technology that enables quick fulfillment of requests for dispatch of taxis made by users in a larger area.

BRIEF DESCRIPTION OF THE DRAWINGS

FIG. 1 is a diagram illustrating an exemplary system configuration of a taxi management system.

FIG. 2 is a diagram schematically illustrating an exemplary configuration of a taxi.

FIG. 3 is a diagram illustrating exemplary hardware configurations of an on-vehicle apparatus and a server apparatus.

FIG. 4 is a block diagram illustrating an exemplary functional configuration of the server apparatus according to a first embodiment.

FIG. 5 illustrates an exemplary structure of a location information table according to the first embodiment.

FIG. 6 illustrates an exemplary structure of a region information table according to the first embodiment.

FIG. 7 is a flow chart of a process executed by the server apparatus according to the first embodiment.

FIG. 8 is a block diagram illustrating an exemplary functional configuration of the server apparatus according to a second embodiment.

FIG. 9 is a flow chart of a process executed by the server apparatus according to the second embodiment.

DESCRIPTION OF THE EMBODIMENTS

A system according to the present disclosure can disperse empty taxies over a larger area, to thereby enable requests for dispatch of taxis made by users in regions where the demand for taxis is low to be fulfilled quickly. In the following descriptions, the term "a taxi/taxis" shall refer to an empty taxi/taxis, unless stated otherwise.

Taxi dispatch systems using taxi dispatch applications installed on portable terminals (such as smartphones and tablet terminals) are prevailing. In a method, the application is configured to determine the present location of a user using location information (e.g. GPS information) of portable terminals and make a request for dispatch of a taxi on the basis of the location information thus acquired. This method allows the user to order a taxi to be dispatched to the present location of the user even if the user does not know the address of his/her present location. The user may store payment information in the system. This eliminates the need for paying a taxi fare when getting off the taxi.

Drivers of empty taxis tend to stay in regions where the demand for taxis is high (e.g. busy streets and regions near train stations) with a view to increasing their sales (or income). This can result in many taxis in some regions and an unduly small number of taxis in regions where the demand for taxis is low (e.g. suburban regions and residential regions). In such circumstances, if a request for dispatch of a taxi is made by a user in a region where the number of taxis is small, it may be impossible to deliver a taxi quickly to the user. In cases where a user makes a request for dispatch of a taxi using a taxi dispatch application, if it takes long time for a taxi to come to the user's place after the user's requesting operation, the user is likely to give up the hope of taking the taxi. Then, for example, the user may take a taxi other than the taxi dispatched to him/her (e.g. a taxi casually passing by the user or a taxi belonging to another taxi company) or use other transportation means.

A method for avoiding the above situation is when a region where the number of taxis located in it exceeds a predetermined upper limit (which will be referred to as "overpopulated region") is found, to move some of the taxis in the overpopulated region to a designated region. Another method is when a region where the number of taxis located in it is lower than a predetermined lower limit (which will be referred as "sparsely-populated region") is found, to move some of taxis located in another region (e.g. an overpopulated region) to the sparsely-populated region. In this case, however, if the region to which a taxi is moved is a region with low demand for taxis, there is a possibility that the taxi cannot get a passenger, leading to the driver's loss of chance of increasing the sales. For this reason, drivers requested to remove to another region may hesitate to remove to that region. This adversely affects the dispersing of taxis over a larger area.

To solve the above problem, when requesting a driver of a taxi to remove to another region, a system according to the present disclosure presents information about an incentive (or reward) that will be given to the driver if he or she accepts the request for removal. This means that even if no user takes the taxi after the removal to another region, a potential loss of sales of the taxi driver is compensated for at least partly. This motivates the taxi driver to remove to another region. As a result, concentration of taxis in specific regions (such as regions with high demand for taxis) is mitigated, and taxis are dispersed over a larger area. In consequence, when requests for dispatch of a taxi are made by users located in regions with low demand for taxi, the requests can be fulfilled more quickly.

The aforementioned predetermined upper limit is a criterion used to determine whether the number of taxis in each region is excessive. This upper limit is set for each of the regions on a region-by-region basis. The predetermined upper limit as such may be set based on the demanded number of taxis in each region. Specifically, the predetermined upper limit may be set equal to the demanded number of taxis in each region or the demanded number plus a certain margin. Hence, the larger the demanded number of taxis in a region is, the higher the predetermined upper limit is set. The demanded number of taxis in a region may be estimated based on the number of people waiting for taxis at a taxi stand(s) in that region or statistics of the number of people who used taxis in that region in the past. The predetermined upper limit may be set based on the size (or the area) of each region. Specifically, the predetermined upper limit may be set equal to the product of the demanded number of taxis per unit area and the area of each region (or that number plus a certain margin). Alternatively, the predetermined upper limit may be set based on the population of each region. Specifically, the predetermined upper limit may be set equal to the product of the demanded number of taxis per person and the population of each region (or that number plus a certain margin).

The aforementioned predetermined lower limit is a criterion used to determine whether the number of taxis in each region is deficient. This lower limit is set for each of the regions on a region-by-region basis. The predetermined lower limit as such may be set based on the demanded number of taxis in each region. Specifically, the predetermined lower limit may be set equal to the demanded number of taxis in each region minus a certain margin. Hence, the smaller the demanded number of taxis in a region is, the lower the predetermined lower limit is set. The predetermined lower limit may be set based on the size (or the area) of each region. Specifically, the predetermined lower limit may be set equal to the product of the demanded number of taxis per unit area and the area of each region minus a certain margin. Alternatively, the predetermined lower limit may be set based on the population of each region. Specifically, the predetermined lower limit may be set equal to the product of the demanded number of taxis per person and the population of each region minus a certain margin.

The value of the incentive to be given to drivers who accept a request for removal may be a fixed value determined in advance. Alternatively, the value of the incentive to be given to drivers who accept a request for removal may be varied in accordance with the difference between the demanded number of taxis in the departure region from which the taxi is to remove (which may be an overpopulated region) and that in the destination region to which the taxi is to remove (which may be a sparsely-populated region). For example, in the case where the demanded number of taxis in the departure region is larger than that in the destination region, the larger their difference is, the larger the value of the incentive may be made. This will enhance the driver's motivation to removal. Moreover, the larger the distance from the present location of the taxi to the destination region designated by the request for removal is, the larger the value of the incentive may be made. This will enhance the driver's motivation to removal even if the destination region designated by the request for removal is a region with low demand for taxis.

The number of taxis to which an incentive is given may be limited to a certain number. This is because removal of a large number of taxis from an overpopulated region to a sparsely-populated region can result in deficiency in the number of taxis in the former region and/or excess in the number of taxis in the latter region. The limitation of the number of taxis to which an incentive is given can lead to efficient dispersion of taxis over the service area. The aforementioned "certain number" may be determined in accordance with the difference between the number of taxis located in the destination region designated by the request for removal and the demanded number of taxis in that region. Alternatively, this "certain number" may be determined in accordance with the difference between the number of taxis located in the departure region and the demanded number of taxis in that region.

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless otherwise stated.

First Embodiment

A system for managing operations of taxis (or taxis management system) will be described as a first embodiment of the present disclosure.

General Outlines of Taxi Management System

FIG. 1 is a diagram illustrating the configuration of a taxi management system. The taxi management system illustrated in FIG. 1 includes a plurality of taxis 10 and a server apparatus 200. The taxis 10 managed by the system according to this embodiment are vehicles that are driven by human drivers.

As illustrated in FIG. 2, each taxi 10 is equipped with an on-vehicle apparatus 100. The on-vehicle apparatus 100 can be connected to the server apparatus 200 via a network. This network may be, for example, a WAN (Wide Area Network), which may be a global public communication network such as the Internet, or other communication network. The on-vehicle apparatus 100 is connected to the network by wireless communication. Examples of the wireless communication include mobile communications, such as 5G mobile communications or LTE (Long Term Evolution) mobile communications, narrow-band communications, such as DSRC (Dedicated Short Range Communications), and WiFi (registered trademark).

The on-vehicle apparatus 100 acquires information about the present location of the taxi 10 equipped with it and transmits the acquired information about the present location (or location information) to the server apparatus 200 with identification data (or vehicle ID) of the taxi 10 equipped with the on-vehicle apparatus 100. The on-vehicle apparatus 100 executes the processing of acquiring information about the present location and transmitting the location information repeatedly at predetermined intervals. The on-vehicle apparatus 100 may execute the processing of acquiring information about the present location and transmitting the location information in response to a request by the server apparatus 200.

The server apparatus 200 executes a process for dispersing the taxis 10 under its management over a large area using location information received from the on-vehicle apparatuses 100. The server apparatus 200 in the system according to this embodiment detects regions where there are taxis 10 more in number than a predetermined upper limit using the location information of the taxis 10. In this connection, the entire service area over which the taxis 10 under the management of the server apparatus 200 operate is divided into a plurality of regions (or divisional areas) in advance. The server apparatus 200 calculates the number of taxis 10 located in each region in the aforementioned service area using the location information received from the on-vehicle apparatuses 100. Then, the server apparatus 200 detects overpopulated regions in which the number of taxis 10 exceeds a predetermined upper limit among the regions in the overall service area. This upper limit is a criterion used to determine excess of the number of taxis located in each region. The predetermined upper limit is set for each of the regions on a region-by-region basis. In the case of this embodiment, the predetermined upper limit for each region is set equal to the demanded number of taxis 10 in that region plus a predetermined margin. Hence, the larger the demanded number of taxis in a region is, the higher the predetermined upper limit is made. The demanded number of taxis 10 in each region is estimated from, for example, the number of people waiting for taxis at a taxi stand(s) in that region or statistics of the number of people who used taxis in that region in the past.

When an overpopulated region as above is detected, the server apparatus 200 sends a request for removal to the on-vehicle apparatuses 100 of the taxis 10 that are located in the overpopulated region. Referring to an exemplary case illustrated in FIG. 1, if region A is an overpopulated region, the server apparatus 200 sends to the on-vehicle apparatuses 100 of the taxis 10 located in region A a request for removal to a certain region (e.g. region B) other than region A. In the system according to the embodiment, the request for removal contains information requesting removal to a specific region other than the overpopulated area and information about an incentive that will be given in return to removal to the specific region. The on-vehicle apparatus 100 having received the request for removal presents this information to the driver of the taxi 10. If the driver performs an operation on the on-vehicle apparatus 100 to indicate his/her acceptance of the request for removal, the on-vehicle apparatus 100 sends information indicating acceptance of the request for removal (or acceptance information) to the server apparatus 200. Then, the incentive offered by the request for removal is given to the driver of the taxi 10 who accepted the request for removal. The incentive mentioned above may be something that will motivate the driver to remove from the overpopulated region to the specific region.

Hardware Configuration

FIG. 3 is a diagram illustrating exemplary configurations of the on-vehicle apparatus 100 and the server apparatus 200. While FIG. 3 shows only one on-vehicle apparatus 100, all the taxis 10 under the management of the server apparatus 200 is each equipped with an on-vehicle apparatus 100 having the configuration illustrated in FIG. 3.

The on-vehicle apparatus 100 may be, for example, a car navigation system that can be connected to a network N1 by wireless communication. Alternatively, the on-vehicle apparatus 100 may be a personal computer (PC) connected to the network N1 by wireless communication. The on-vehicle apparatus 100 may also be a small computer that the driver of the taxis 10 can carry, examples of which include a smartphone, a cellular phone, a tablet terminal, a personal information terminal, a wearable computer (e.g. smartwatch).

The on-vehicle terminal 100 has a processor 101, a main storage unit 102, an auxiliary storage unit 103, a display unit 104, an input unit 105, a location determination unit 106, and a communication unit 107. These components are interconnected by buses. The main storage unit 102 and the auxiliary storage unit 103 are computer-readable recording media. The hardware configuration of the on-vehicle apparatus 100 is not limited to that illustrated in FIG. 3, but some components may be eliminate, replaced, or added.

The processor 101 of the on-vehicle apparatus 100 loads programs stored in a recording medium into a workspace of the main storage unit 102 and executes the programs to control various functional units of the on-vehicle apparatus 100. Thus, the on-vehicle apparatus 100 implements functions for achieving desired purposes.

The processor 101 may be, for example, a CPU (Central Processing Unit) or a DSP (Digital Signal Processor). The processor 101 controls the on-vehicle apparatus 100 and executes computation of various information processing. The main storage unit 102 may include a RAM (Random Access Memory), a ROM (Read Only Memory) and/or the like. The auxiliary storage unit 103 may include an EPROM (Erasable Programmable ROM) or a hard disk drive (HDD). The auxiliary storage unit 103 may include a removable medium, in other words, a portable recording medium. Examples of the removable medium include an USB (Universal Serial Bus) memory and disc recording media, such as a CD (Compact Disc) and a DVD (Digital Versatile Disc).

What is stored in the auxiliary storage unit 103 includes various programs, various data, and various table, which can be written into and read out from the auxiliary storage unit 103 when necessary. The auxiliary storage unit 103 may store an operating system (OS). All or a portion of the aforementioned information or data stored in the auxiliary storage unit 103 may be stored in the main storage unit 102 instead. Likewise, information or data stored in the main storage unit 102 may be stored in the auxiliary storage unit 103 instead.

The display unit 104 may be, for example, a liquid crystal display (LCD), an electroluminescence (EL) panel, or the like. The input unit 105 may include, for example, a touch panel or push buttons used to input alphanumeric characters and/or a microphone used to input voices. The location determination unit 106 is a device capable of determining the present location of the on-vehicle apparatus 100 (that is, the present location of the taxi 10), which typically includes a GPS receiver.

The communication unit 107 is a communication circuit capable of accessing the network N1 using wireless communication provided by a mobile communication service or other means to allow data communications with external devices including the server apparatus 200.

Various processes executed by the on-vehicle apparatus 100 configured as above may be executed either by hardware or software.

The server apparatus 200 has a configuration as an ordinary computer. The server apparatus 200 has a processor 201, a main storage unit 202, an auxiliary storage unit 203, and a communication unit 204. These components are interconnected by busses. The processor 201, the main storage unit 201, and the auxiliary storage unit 203 are similar to the processor 101, the main storage unit 102, and the auxiliary storage unit 103 of the on-vehicle apparatus 100 and therefore will not be described further. The communication unit 204 performs transmission and reception of information to and from external devices. The communication unit 204 may include, for example, a LAN (Local Area Network) interface board or a wireless communication circuit for wireless communication. The LAN interface board or the wireless communication circuit is connected to the network N1. The hardware configuration of the server apparatus 200 is not limited to that illustrated in FIG. 3, but some components may be eliminate, replaced, or added.

Various processes executed by the server apparatus 300 configured as above may be executed either by hardware or software.

Functional Configuration of Server Apparatus

The functional configuration of the server apparatus 200 will now be described with reference to FIG. 4. As illustrated in FIG. 4, the server apparatus 200 includes, as functional components, a location information acquisition part F210, an overpopulated region detection part F220, a removal request creating part F230, a location information management database D210, and a region management database D220.

The server apparatus 200 implements the location information acquisition part F210, the overpopulated region detection part F220, and the removal request creating part F230 by executing computer programs loaded on the main storage unit 202 by the processor 201. The location information acquisition part F210, the overpopulated region detection part F220, and the removal request creating part F230 together constitute the control unit according to the present disclosure. One or some of the location information acquisition part F210, the overpopulated region detection part F220, and the removal request creating part F230 may be implemented by a hardware circuit(s).

The location information management database D210 and the region management database D220 are created by a database management system program (DBMS program) executed by the processor 201. Specifically, these databases are created by managing data stored in the auxiliary storage unit 203 by the DBMS program. The location information management database D210 and the region management database D220 are, for example, relational databases.

One or some of the above functional components of the server apparatus 200 or a part of the processing of them may be implemented by another computer connected to the network N1. For example, the processing executed as the location information acquisition part F210, the processing executed as the overpopulated region detection part F220, and the processing executed as the removal request creating part F230 may be executed by different computers.

The location information management database D210 stores location information of the taxis 10. The location information management database D210 stores information about the present location of each taxis linked with identification data (vehicle ID) of that taxi 10. An example of the location information stored in the location information management database D210 will be described with reference to FIG. 5. FIG. 5 is a diagram illustrating an exemplary table structure of the location information management database D210. It should be noted that the structure of the table stored in the location information management database D210 (which will also be referred to as "location information table" hereinafter) is not limited to that illustrated in FIG. 5, but some fields may be added, changed, or removed fitly.

The location information table in FIG. 5 has the fields of vehicle ID, present location, and region ID. What is stored in the vehicle ID field is the vehicle ID, which is information identifying each taxi 10. What is stored in the present location field is information about the present location of each taxi 10. Examples of the information stored in the present location field may include information about the address of the place where the taxi 10 is located or information representing the coordinates on a map (e.g. longitude and latitude) of the place where the taxi 10 is located. The information stored in the present location field is updated every time the server apparatus 200 receives location information sent from the on-vehicle apparatuses 100 at predetermined intervals. What is stored in the region ID field is information (or region ID) identifying the region in which each taxi 10 is located. The region IDs stored in the region ID field are identifications assigned to respective regions into which the service area of the taxis 10 under the management of the server apparatus 200 is divided. Examples of the region IDs are "A" and "B" in FIG. 1.

Figure 6:
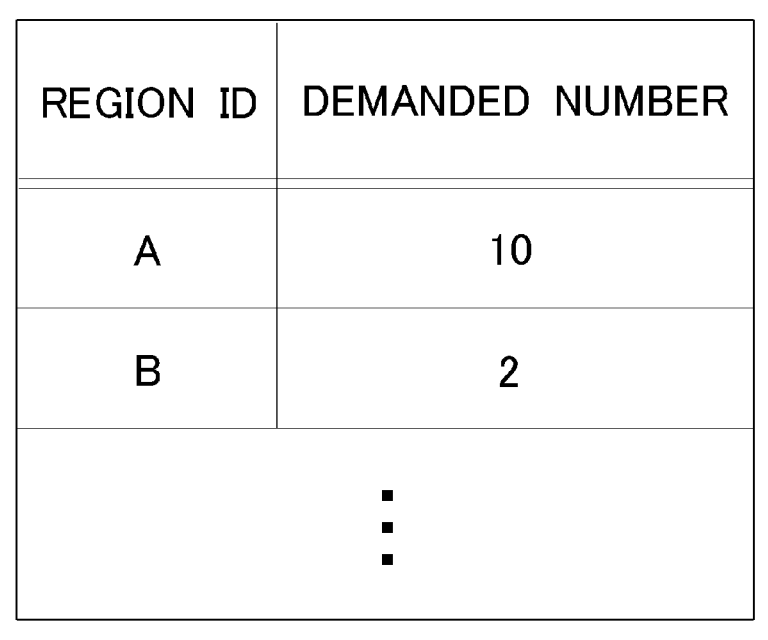

The region management database D220 stores information about the demanded number of taxis 10 in each region. The region management database D220 stores information about the demanded number of taxis in each region linked with identification data (i.e. the region ID) of that region. An example of the region information stored in the region management database D220 will be described with reference to FIG. 6. FIG. 6 is a diagram illustrating an exemplary table structure of the region management database D220. It should be noted that the structure of the table stored in the region management database D220 (which will also be referred to as "region information table" hereinafter) is not limited to that illustrated in FIG. 6, but some fields may be added, changed, or removed fitly.

The region information table in FIG. 6 has the fields of region ID and demanded number. What is stored in the region ID field is the region ID, which is information identifying each region. What is stored in the demanded number field is information about the demanded number of taxis 10 in each region. The information or number stored in the demanded number field is estimated from, for example, the number of people waiting for taxis at a taxi stand(s) in each region or statistics of the number of people who used taxis in each region in the past. The server apparatus 200 may be informed of the number of people waiting for taxis at a taxi stand by the driver of a taxi staying at the taxi stand through the on-vehicle apparatus 100. The number of people waiting for taxis at a taxi stand may be determined from an image captured by a camera provided at the taxi stand. As will be understood, the number of people waiting for taxis at a taxi stand changes with time. Therefore, the information stored in the demanded number field may be updated at predetermined intervals. In the case where the demanded number is estimated based on statistics of the number of people who used taxis in each region in the past, the demanded number may be changed depending on the day of the week and/or time slot.

The location information acquisition part F210 acquires location information, that is, information about the present location of each of the taxis 10. The location information acquisition part F210 in the system according to this embodiment acquires location information of the taxis 10 by receiving the location information sent from the on-vehicle apparatuses 100 of the taxis 10 at predetermined intervals through the communication unit 204. The location information acquisition part F210 identifies the region to which present location of each taxi 10 belongs based on the location information received from the on-vehicle apparatus 10 of the taxi 10. Then, the location information acquisition part F210 stores the information about the present locations of the taxis 10 and the information indicating the regions to which the present locations of the taxis 10 respectively belong in the present location fields and the region ID fields of the location information table linked with the respective vehicles ID of the taxis 10.

The overpopulated region detection part F220 detects overpopulated regions based on information stored in the location information management database D210 and information stored in the region management database D220. Specifically, the overpopulated region detection part F220 consults the location information management database D210 to calculate the number of taxis 10 located in each region. For example, the overpopulated region detection part F220 calculates the number of taxis 10 located in region A by counting the total number of taxis 10 whose associated region ID fields in the location information table store identification data of region A. Furthermore, the overpopulated region detection part F220 consults the region management database D220 to calculate a predetermined upper limit for each region. In this embodiment, as described before, the predetermined upper limit is calculated as the demanded number of taxis in each region plus a predetermined margin. Then, the overpopulated region detection part F220 detects overpopulated regions by comparing the numbers of taxis 10 located in the respective regions with the predetermined upper limits of the respective regions. More specifically, the overpopulated region detection part F220 according to the embodiment detects regions in which the number of taxis 10 exceeds the predetermined upper limit as overpopulated regions. When an overpopulated region is detected, the overpopulated region detection part F220 sends to the removal request creation part F230 the region identification data of the overpopulated region and the vehicle IDs of the taxis 10 located in the overpopulated region.

The removal request creation part F230 creates a removal request to be sent to the on-vehicle apparatuses 100 of the taxis 10 located in the overpopulated region. As described previously, the removal request according to the embodiment contains information requesting removal to a specific region other than the overpopulated region and information about an incentive that will be given in return to removal to the specific region. The specific region is a region among the regions in the overall service area other than the overpopulated region. More specifically, the specific region is a region other than the overpopulated region in which the number of taxis 10 is smaller than the predetermined upper limit or the number of taxis 10 is smaller than the demanded number. In cases where there is a sparsely-populated region among regions in the overall service area, the removal request creation part F230 may select the sparsely-populated region as the specific region. The sparsely-populated region is a region where the number of taxis 10 located therein is smaller than a predetermined lower limit. The predetermined lower limit is set for each region as the demanded number of taxis 10 in that region minus a predetermined margin.

As described previously, the incentive that will be given in return to removal to the specific region is something that will motivate the driver to move from the overpopulated region to the specific region. Examples of the incentive as such include money added to the sales of the driver or time off given to the driver. In the case of this embodiment, the incentive is money added to the sales of the driver. This incentive may be a fixed value of money that is determined in advance. Alternatively, the incentive may be a variable value that is varied in accordance with the difference between the demanded number of taxis in the overpopulated region and the demanded number of taxis in the specific region. For example, in the case where the demanded number in the overpopulated region is larger than the demanded number in the specific region, the larger difference is, the larger the incentive may be made. Alternatively, the incentive may be a variable value that is varied in accordance with the distance from the present location of the taxi 10 (in the overpopulated region) to the specific region. For example, the larger the distance from the overpopulated region to the specific region is, the larger the incentive may be made.

The removal request created by the removal request creation part F230 is sent through the communication unit 204 to the on-vehicle apparatuses 100 of the taxis 10 located in the overpopulated region. The on-vehicle apparatus 100 of each taxi 10 located in the overpopulated region executes the processing of prompting the driver to select acceptance or refusal of the removal request. For example, the on-vehicle apparatus 100 displays on its touch panel information requesting removal from the overpopulated region to the specific region, information about the incentive that will be given if the driver accepts the removal request, and a button(s) for driver's selection between acceptance and refusal of the removal request. If the driver performs an operation to select the acceptance of the removal request, the on-vehicle apparatus 100 sends information indicating the acceptance of the removal request (which will be referred to as "acceptance information") to the server apparatus 200. When the server apparatus 200 receives the acceptance information, the server apparatus 200 executes the processing of giving the incentive to the driver who has accepted the removal request. For example, the server apparatus 200 executes the processing of adding the incentive to the sales of the driver who has accepted the removal request.

The number of taxis 10 (or the number of drivers) to which the incentive is given may be limited to a certain number. This is because removal of an excessively large number of taxis from the overpopulated region to the specific region can result in deficiency in the number of taxis in the former region and/or excess in the number of taxis in the latter region, which may have been sparsely populated. The aforementioned "certain number" may be set equal to the difference between the number of taxis 10 located in the destination region (i.e. the specific region mentioned above) designated by the request for removal and the demanded number of taxis in that region or the predetermined upper limit in that region. Alternatively, this "certain number" may be set equal to the difference between the number of taxis 10 located in the overpopulated region and the demanded number of taxis in that region or the predetermined upper limit in that region.

Process Performed by Server Apparatus

A process performed by the server apparatus 200 according to the embodiment will be described with reference to FIG. 7. FIG. 7 is a flow chart of the process performed by the server apparatus 200.

In the process according to FIG. 7, the location information acquisition part F210 of the server apparatus 200 acquires location information of the taxis 10 (step S101). Specifically, the location information acquisition part F210 acquires location information of the taxis 10 by receiving location information and vehicle IDs sent from the on-vehicle apparatuses 100 of the respective taxis 10 at predetermined intervals through the communication unit 204. Then, the location information acquisition part F210 determines the region to which the present location of each taxi 10 belongs based on the location information acquired in step S101 (step S102). The location information acquisition part F210 accesses the location information management database D210 based on the vehicle ID received in step S101, and updates the information associated with the vehicle ID in the location information table. Specifically, the location information acquisition part F210 replaces the information stored in the present location field associated with the vehicle ID in the location information table by the location information acquired in step S101. Moreover, the location information acquisition part F210 replaces the information stored in the region ID field associated with the vehicle ID in the location information table by the region ID determined in step S102.

After completion of the above updating of information in the location information management database D210, the overpopulated region detection part F220 of the server apparatus 200 executes the processing of detecting overpopulated regions (step S103). Specifically, the overpopulated region detection part F220 firstly consults the location information management database D210 to calculate the numbers of taxis 10 located in the respective regions. Then, the overpopulated region detection part F220 consults the region management database D220 to calculate the predetermined upper limits for the respective regions. Then, the overpopulated region detection part F220 detects regions in which the number of taxis 10 exceeds the predetermined upper limit as overpopulated regions. If no overpopulated regions are detected in this processing of detecting overpopulated regions (a negative answer in step S104), the server apparatus 200 terminates this process. If an overpopulated region(s) is detected in the processing of detecting overpopulated regions (an affirmative answer in step S104), the server apparatus 200 executes the processing of step S105 next.

In step S105, the removal request creation part F230 of the server apparatus 200 creates a removal request. Specifically, the removal request creation part F230 firstly determines a region to which some of the taxis 10 in an overpopulated region are to remove (namely, the specific region mentioned above). For example, the removal request creation part F230 may select a region other than the overpopulated regions in which the number of taxis 10 is smaller than a predetermined upper limit. Alternatively, the removal request creation part F230 may select a region other than the overpopulated regions in which the number of taxis 10 is smaller than the demanded number. If there is a region in which the number of taxis 10 is smaller than a predetermined lower limit (namely, a sparsely-populated region), the removal request creation part F230 may select this region as the specific region. Then, the removal request creation part F230 determines an incentive to be given in return to removal from the overpopulated region to the specific region (or in return to acceptance of the removal request). If, for example, the demanded number of taxis 10 in the overpopulated region is larger than that in the specific region, the larger the difference in the demanded number between these regions is, the larger the incentive may be made. Moreover, the larger the distance between the overpopulated region and the specific region is, the larger the incentive may be made. After determining the specific region and the incentive, the removal request creation part F230 creates a signal serving as a removal request, which contains information requesting removal from the overpopulated region to the specific region and information about an incentive that will be given in return to removal from the overpopulated region to the specific region. Then, the removal request creation part F230 sends the removal request created in step S105 to the on-vehicle apparatuses 100 of the taxis 10 located in the overpopulated region through the communication unit S204 (step S106).

When the server apparatus 200 receives acceptance information sent from the on-vehicle apparatus 100 of a taxi 10 located in the overpopulated region, the server apparatus 200 sends the incentive determined in step S105 to the driver of the taxi 10 who has accepted the removal request. Specifically, the server apparatus 200 adds the incentive to the sales of the driver who has accepted the removal request. The time to give the incentive may be either the time when the server apparatus 200 receives the acceptance information or the time when the taxi 10 of the driver who has accepted the removal request actually removes to the specific region. Then, the server apparatus 200 makes a determination as to whether the number of taxis 10 whose drivers have accepted the removal request reaches the predetermined number (step S107). If the number of taxis 10 whose drivers have accepted the removal request reaches the predetermined number (an affirmative answer in step S107), the server apparatus 200 stops accepting the acceptance information (step S108). Then, the server apparatus 200 may send information indicating that acceptance of the acceptance information has already been stopped to the on-vehicle apparatuses 100 of the taxis still remaining in the overpopulated region. As described previously, the predetermined number may be set equal to the difference between the number of taxis 10 located in the specific region and the demanded number of taxis (or the predetermined upper limit) in the specific region. Alternatively, the predetermined number may be set equal to the difference between the number of taxis 10 located in the overpopulated region and the demanded number of taxis (or the predetermined upper limit) in the overpopulated region. Setting the predetermined number as above can prevent the number of taxis 10 removing from the overpopulated region to the specific region from becoming unduly large.

In the process according to the flow chart in FIG. 7, when an overpopulated region is detected in the service area, the server apparatus 200 offers to the drivers of the taxis 10 located in the overpopulated region an incentive that will be given in return to removal to a specific region. This can motivate the drivers of the taxis 10 located in the overpopulated region to remove to the specific region. As a result, the overpopulation of taxis 10 in some regions, such as regions where the demand for taxis 10 is high, will be relieved. This means that taxis 10 can be dispersed over a larger area in the overall service area. Moreover, since the number of taxis 10 to which the incentive is given is limited to a predetermined number, removal of an unduly large number of taxis 10 from the overpopulated region to the specific region is avoided. This can lead to more efficient dispersion of taxis 10 in the service area.

Second Embodiment

A taxi management system according to a second embodiment of the present disclosure will be described next. The taxi management system according to the second embodiment has a configuration similar to the system according to the first embodiment illustrated in FIG. 1. In the following description of the second embodiment, components and control processes that are substantially the same as those in the first embodiment will not be described in further detail.

The taxi management system according to the first embodiment described above is configured to detect an overpopulated region, and when an overpopulated region is detected, the system sends a removal request to the taxis 10 located in the overpopulated region. On the other hand, the taxi management system according to the second embodiment that will be described in the following is configured to detect a sparsely-populated region, and when a sparsely-populated region is detected, the system sends a request for removal to the sparsely-populated region to taxis 10 located in regions other than the sparsely-populated region.

Functional Configuration of Server Apparatus

The functional configuration of the server apparatus 200 in the system according to the second embodiment will now be described with reference to FIG. 8. As illustrated in FIG. 8, the server apparatus 200 according to the second embodiment includes, as functional components, a location information acquisition part F210, a sparsely-populated region detection part F240, a removal request creation part F230, a location information management database D210, and a region management database D230. Among the above functional components, the location information acquisition part F210, the location information management database D210, and the region management database D220 are the same as those in the system according to the first embodiment and will not be described further.

The sparsely-populated region detection part F240 detects sparsely-populated regions based on information stored in the location information management database D210 and information stored in the region management database D220. Specifically, the sparsely-populated region detection part F240 consults the location information management database D210 to calculate the number of taxis 10 located in each region. Furthermore, the sparsely-populated region detection part F240 calculates a predetermined lower limit for each region based on the demanded number in each region stored in the area management database D220. The predetermined lower limit mentioned above is a criterion used to determine whether the number of taxis in each region is deficient. This lower limit is set for each of the regions on a region-by-region basis. In this embodiment, the predetermined lower limit is set equal to the demanded number of taxis in each region minus a certain margin. Hence, in this embodiment, the smaller the demanded number of taxis in a region is, the lower the predetermined lower limit is set. Then, the sparsely-populated region detection part F240 detects sparsely-populated regions by comparing the numbers of taxis 10 located in the respective regions with the predetermined lower limits in the respective regions. More specifically, the sparsely-populated region detection part F240 according to the second embodiment detects regions in which the number of taxis 10 exceeds the predetermined upper limit as sparsely-populated regions. When a sparsely-populated region is detected, the sparsely-populated region detection part F240 sends to the removal request creation part F230 the region identification data of the sparsely-populated region and the vehicle IDs of the taxis 10 located in the sparsely-populated region.

The removal request creation part F230 creates a removal request to be sent to the on-vehicle apparatuses 100 of the taxis 10 located in regions other than the sparsely-populated region. This removal request contains information requesting removal from regions (departure regions) other than the sparsely-populated region to the sparsely-populated region and information about an incentive that will be given in return to removal to the sparsely-populated region. The aforementioned departure regions are regions among the regions in the overall service area other than the sparsely-populated region. For example, the departure regions are regions in which the number of taxis 10 is larger than the demanded number. In cases where there are overpopulated regions among the regions other than the sparsely-populated region, the removal request creation part F230 may select such overpopulated regions as departure regions.

Process Performed by Server Apparatus

A process performed by the server apparatus 200 according to the second embodiment will now be described with reference to FIG. 9. FIG. 9 is a flow chart of the process performed by the server apparatus 200. The processing steps in FIG. 9 that are the same as those in FIG. 7 are denoted by the same reference signs.

In the flow chart in FIG. 9, the processing steps S103 and S104 in the flow chart in FIG. 7 are replaced by the processing steps of S201 and S202. In step S201, the sparsely-populated region detection part F240 of the server apparatus 200 executes the step of detecting sparsely-populated regions (step S201). Specifically, the sparsely-populated region detection part F240 firstly consults the location information management database D210 to calculate the numbers of taxis 10 located in the respective regions. Then, the sparsely-populated region detection part F240 calculates the predetermined lower limit for each region based on the demanded number in each region stored in the area management database D220. More specifically, the sparsely-populated region detection part F240 calculates the predetermined lower limit for each region by subtracting a certain margin from the demanded number of taxis 10 in that region. Then, the sparsely-populated region detection part F240 detects regions in which the number of taxis 10 is lower than the predetermined lower limit as sparsely-populated regions. If no sparsely-populated regions are detected in this processing of detecting sparsely-populated regions (a negative answer in step S202), the server apparatus 200 terminates this process. If a sparsely-populated region(s) is detected in the processing of detecting sparsely-populated regions (an affirmative answer in step S202), the server apparatus 200 executes the processing of step S105 onward. In step S106, if there is an overpopulated region(s) among the regions other than the sparsely-populated regions, the removal request creation part F230 sends a removal request to the on-vehicle apparatuses 100 of the taxis 10 located in the overpopulated region(s).

In the above-described process, when a sparsely-populated region is detected in the service area, the server apparatus 200 offers to the drivers of the taxis 10 located in a region(s) other than the sparsely-populated region an incentive that will be given in return to removal to the sparsely-populated region. This can motivate the drivers of the taxis 10 located in the region(s) other than the sparsely-populated region to remove to the sparsely-populated region. As a result, the number of taxis 10 located in regions with low demand for taxis is prevented from becoming deficient. In other words, taxis 10 are dispersed favorably even in regions with low demand of taxis 10. This makes it possible to fulfil a request for dispatch of a taxi quickly, even if the request is made in a region with low demand for taxis 10.

OTHERS

The above embodiments have been described only by way of example. Modifications can be made to the above embodiments without departing from the essence of the present disclosure.

The processing and means that have been described in the foregoing may be employed in any combination so long as it is technically feasible to do so. One, some, or all of the processes according to the embodiments that have been described as processes performed by one apparatus may be performed by a plurality of apparatuses in a distributed manner. One, some, or all of the processes according to the embodiments that have been described as processes performed by different apparatuses may be performed by a single apparatus. The hardware configuration employed to implement various functions in a computer system may be modified flexibly.

The present disclosure can be carried out by supplying a computer program(s) that implements the functions described in the above description of the embodiments to a computer to let one or more processors of the computer read and execute the program(s). Such a computer program(s) may be supplied to the computer by a computer-readable, non-transitory storage medium that can be connected to a system bus of the computer, or through a network. The computer-readable, non-transitory storage medium refers to a recording medium that can store information, such as data and programs, electrically, magnetically, optically, mechanically, or chemically in such a way as to allow the computer or the like to read the stored information. Examples of the computer-readable, non-transitory storage medium include any type of disc medium including a magnetic disc, such as a floppy disc (registered trademark) and a hard disk drive (HDD), and an optical disc, such as a CD-ROM, a DVD and a Blu-ray disc. The computer-readable, non-transitory storage medium may include other storage media, such as a read-only memory (ROM), a random access memory (RAM), an EPROM, an EEPROM, a magnetic card, a flash memory, an optical card, and a solid state drive (SSD).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus comprising:
a memory; and
a processor connected to an on-vehicle apparatus of each of a plurality of taxis through a network, the processor being programmed to:
periodically receive location information indicating the present location of each of the taxis, the location information being (i) acquired by a Global Positioning System (GPS) receiver of the on-vehicle apparatus of each taxi and (ii) transmitted from the on-vehicle apparatus of each taxi;
update stored location information, stored in the memory, of each taxi each time the location information indicating the present location of each taxi is received;
calculate a number of the taxis located in each of a plurality of regions based on the updated stored location information;
detect an overpopulated region of the plurality of regions in which a corresponding calculated number of the taxis is greater than a predetermined upper limit; and
transmit a removal request to an on-vehicle apparatus of a designated taxi of the plurality of taxis located in the overpopulated region, the removal request being a signal containing (i) information requesting removal of the designated taxi from the overpopulated region to a specific region of the plurality of regions other than the overpopulated region and (ii) information about an incentive that will be given if the designated taxi moves to the specific region.

2. An information processing apparatus according to claim 1, wherein
the processor is further programed to
detect a sparsely-populated region of the plurality of regions in which a corresponding calculated number of the taxis is smaller than a predetermined lower limit based on the calculated number of the taxis located in each of the regions, and
set the sparsely-populated region as the specific region.

3. An information processing apparatus according to claim 1, wherein
the processor sets the predetermined upper limit differently for each of the plurality of regions such that the predetermined upper limit is larger in corresponding ones of the regions having a larger demanded number of taxis.

4. An information processing apparatus according to claim 2, wherein
the processor sets the predetermined upper limit differently for each of the plurality of regions such that the predetermined upper limit is larger in corresponding ones of the regions having a larger demanded number of taxis.

5. An information processing apparatus according to claim 1, wherein when a first demanded number of taxis in the overpopulated region is larger than a second demanded number of taxis in the specific region, the processor sets the incentive to be larger, the larger a difference between the first and the second demanded numbers is.

6. An information processing apparatus according to claim 1, wherein the processor sets the incentive to be larger, the larger a distance from the present location of the designated taxi to the specific region is.

7. An information processing apparatus according to claim 1, wherein the processor limits a number of the taxis to which the incentive is given to a predetermined number.

8. An information processing apparatus comprising:
a memory; and
a processor connected to an on-vehicle apparatus of each of a plurality of taxis through a network, the processor being programmed to:
periodically receive location information indicating the present location of each of the taxis, the location information being (i) acquired by a Global Positioning System (GPS) receiver of the on-vehicle apparatus of each taxi and (ii) transmitted from the on-vehicle apparatus of each taxi;
update stored location information, stored in the memory, of each taxi each time the location information indicating the present location of each taxi is received;
calculate a number of the taxis located in each of a plurality of regions based on the updated stored location information;
detect a sparsely-populated region of the plurality of regions in which a corresponding calculated number of the taxis is less than a predetermined lower limit; and
transmit a removal request to an on-vehicle apparatus of a designated taxi of the plurality of taxis located in a different region of the plurality of regions other than the sparsely-populated region, the removal request being a signal containing (i) information requesting removal of the designated taxi from the different region to the sparsely-populated region and (ii) information about an incentive that will be given if the designated taxi moves to the sparsely-populated region.

9. An information processing apparatus according to claim 8, wherein the processor is programed to
detect, as the different region, an overpopulated region of the plurality of regions in which a corresponding calculated number of the taxis is larger than a predetermined upper limit is detected, and
transmit the removal request to the on-vehicle apparatus of the designated taxi based on the designated taxi being located in the overpopulated region.

10. An information processing apparatus according to claim 8, wherein
the processor sets the predetermined upper limit differently for each of the plurality of regions such that the predetermined lower limit is smaller in corresponding ones of the regions having a, smaller demanded number of taxis.

11. An information processing apparatus according to claim 9, wherein
the processor sets the predetermined upper limit differently for each of the plurality of regions such that the predetermined lower limit is smaller in corresponding ones of the regions having a, smaller demanded number of taxis.

12. An information processing apparatus according to claim 8, wherein when a first demanded number of taxis in the different region is larger than a second demanded number of taxis in the sparsely-populated region, the processor sets the incentive to be larger, the larger a difference between the first and the second demanded numbers is.

13. An information processing apparatus according to claim 8, wherein the processor sets the incentive to be larger, the larger a distance from a present location of the designated taxi to the sparsely-populated region is.

14. An information processing apparatus according to claim 8, wherein the processor limits a number of the taxis to which the incentive is given to a predetermined number.

15. An information processing method configured to cause a computer connected to an on-vehicle apparatus of each of a plurality of taxis through a network to execute the processing of:
- periodically receiving location information indicating the present location of each of the taxis, the location information being (i) acquired by a Global Positioning System (GPS) receiver of the on-vehicle apparatus of each taxi and (ii) transmitted from the on-vehicle apparatus of each taxi;
- updating stored location information, stored in a memory, of each taxi each time the location information indicating the present location of each taxi is received;
- calculating a number of the taxis located in each of a plurality of regions based on the updated stored location information;
- detecting an overpopulated region of the plurality of regions in which a corresponding calculated number of the taxis is greater than a predetermined upper limit; and
- transmitting a removal request to an on-vehicle apparatus of a designated taxi of the plurality of taxis located in the overpopulated region, the removal request being a signal containing (i) information requesting removal of the designated taxi from the overpopulated region to a specific region of the plurality of regions other than the overpopulated region and (ii) information about an incentive that will be given if the designated taxi moves to the specific region.

16. An information processing method according to claim 15, wherein the computer is further caused to execute the processing of:
- detecting a sparsely-populated region of the plurality of regions in which a corresponding calculated number of the taxis is smaller than a predetermined lower limit based on the calculated number of the taxis located in each of the regions, and
- setting the sparsely-populated region as the specific region.

17. An information processing method according to claim 15, wherein
the computer is further caused to execute the processing of setting the predetermined upper limit differently for each of the plurality of regions such that the predetermined upper limit is larger in corresponding ones of the regions having a larger demanded number of taxis.

18. An information processing method according to claim 15, wherein when a first demanded number of taxis in the overpopulated region is larger than a second demanded number of taxis in the specific region, the computer is caused to execute the processing of setting the incentive to be larger, the larger a difference between the first and the second demanded numbers is.

19. An information processing method according to claim 15, wherein the computer is caused to execute the processing of setting the incentive to be larger, the larger a distance from the present location of the designated taxi to the specific region is.

20. An information processing method according to claim 15, wherein the computer is caused to execute the processing of limiting a number of the taxis to which the incentive is given to a predetermined number.

* * * * *